United States Patent
Sackmann et al.

(10) Patent No.: US 9,677,430 B2
(45) Date of Patent: Jun. 13, 2017

(54) COMBINED CYCLE POWER PLANT

(71) Applicant: ALSTOM Technology Ltd, Baden (CH)

(72) Inventors: Hans-Juergen Sackmann, Görwihl (DE); Christian Joachim Bohtz, Zurich (CH); Giovanni Leone, Hausen (CH); Henrik Nielsen, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 886 days.

(21) Appl. No.: 14/014,797

(22) Filed: Aug. 30, 2013

(65) Prior Publication Data
US 2013/0340405 A1 Dec. 26, 2013

Related U.S. Application Data

(63) Continuation of application No. PCT/EP2012/053351, filed on Feb. 28, 2012.

(30) Foreign Application Priority Data

Mar. 1, 2011 (CH) ........................................ 0349/11

(51) Int. Cl.
*F01K 23/10* (2006.01)
*F01K 17/02* (2006.01)
(Continued)

(52) U.S. Cl.
CPC .......... *F01K 23/101* (2013.01); *F01K 17/025* (2013.01); *F01K 23/10* (2013.01);
(Continued)

(58) Field of Classification Search
CPC ...... F01K 23/101; F01K 23/105; F01K 23/10; F01K 23/14; F01K 23/16; F01K 17/025; F22B 1/00
See application file for complete search history.

(56) References Cited

U.S. PATENT DOCUMENTS

| | | | |
|---|---|---|---|
| 4,492,084 A | | 1/1985 | Spliethoff |
| 4,550,562 A | * | 11/1985 | Rice ........................ F01K 23/10 60/728 |

(Continued)

FOREIGN PATENT DOCUMENTS

| | | |
|---|---|---|
| EP | 1 050 667 | 11/2000 |
| EP | 1 561 911 | 8/2005 |

(Continued)

OTHER PUBLICATIONS

Kumanin, "Heat exchanger", Metallurgical Explanatory Dictionary, pp. 369, 1989.

(Continued)

*Primary Examiner* — Craig Kim
(74) *Attorney, Agent, or Firm* — Marc A. Vivenzio; GE Global Patent Operation

(57) ABSTRACT

A combined cycle power plant with a gas and steam turbine system arranged on a single shaft and integrated with a cogeneration plant having a heat consumer such as a district heating system or industrial plant, including one or more steam extractions at an intermediate-pressure steam turbine that are arranged at the upper casing half-shell of the turbine and extraction steam lines that lead the extracted steam to heat exchangers of the cogeneration plant. The steam extraction outlets are arranged either singly at or near the uppermost point of the casing or in pairs to either side of the uppermost point of the casing. The specific arrangement of the extractions allows a floor-mounting of the single-shaft combined cycle power plant and as such a cost and space efficient realization of the power plant.

13 Claims, 3 Drawing Sheets

(51) Int. Cl.
F01K 23/14 (2006.01)
F22B 1/00 (2006.01)
F01K 23/16 (2006.01)

(52) U.S. Cl.
CPC .............. *F01K 23/14* (2013.01); *F01K 23/16* (2013.01); *F22B 1/00* (2013.01); *Y02E 20/14* (2013.01); *Y02E 20/16* (2013.01)

(56) References Cited

U.S. PATENT DOCUMENTS

| | | | |
|---|---|---|---|
| 4,550,569 A | 11/1985 | Isa et al. | |
| 4,744,726 A | 5/1988 | Remberg | |
| 4,961,310 A | 10/1990 | Moore et al. | |
| 6,162,013 A * | 12/2000 | Kallberg | F01D 1/023 415/100 |
| 6,240,718 B1 | 6/2001 | Fetescu | |
| 6,405,537 B1 * | 6/2002 | Wada | F01K 13/025 60/39.182 |
| 2008/0010968 A1 * | 1/2008 | Hartmann | F01K 7/16 60/39.182 |
| 2011/0247333 A1 * | 10/2011 | Srinivasan | F01D 9/065 60/663 |
| 2012/0240549 A1 * | 9/2012 | Pang | F01K 13/02 60/39.182 |
| 2012/0261922 A1 * | 10/2012 | Grumann | F01K 7/22 290/52 |
| 2014/0311601 A1 * | 10/2014 | Nakamura | F01K 3/22 137/861 |

FOREIGN PATENT DOCUMENTS

| | | |
|---|---|---|
| JP | S61-66808 | 4/1986 |
| JP | 62-101809 | 5/1987 |
| JP | S62-158106 | 10/1987 |
| JP | H2-241904 | 9/1990 |
| JP | H03-37305 | 2/1991 |
| JP | H04-295106 | 10/1992 |
| JP | H05-10703 | 2/1993 |
| JP | H06-212908 | 8/1994 |
| JP | H06-341303 | 12/1994 |
| JP | H08-189308 | 7/1996 |
| JP | H08-284615 | 10/1996 |
| JP | 09-125912 | 5/1997 |
| JP | 2000-500206 | 1/2000 |
| JP | 2004-169625 | 6/2004 |
| JP | 2006-046087 | 2/2006 |
| JP | 2007-239685 | 9/2007 |
| JP | 2008-280855 | 11/2008 |
| JP | 2009-138748 | 6/2009 |
| RU | 67241 U1 | 10/2007 |
| WO | 00/12871 | 3/2000 |
| WO | 2008/101830 | 8/2008 |

OTHER PUBLICATIONS

Unofficial English Translation of Russian Office Action issued in connection with corresponding RU Application No. 2013143988 on Jul. 6, 2016.

* cited by examiner

COMBINED CYCLE POWER PLANT

CROSS-REFERENCE TO RELATED APPLICATIONS

This application claims priority to PCT/EP2012/053351 filed Feb. 28, 2012, which in turn claims priority to Swiss application 00349/11 filed Mar. 1, 2011, the contents of which are both hereby incorporated in their entirety.

TECHNICAL FIELD

The present invention pertains to a combined cycle power plant comprising a gas and steam turbine and heat recovery steam generator, and in particular to a combined cycle power plant integrated with a cogeneration plant and/or district heating by means of steam extraction. The invention pertains in particular to a floor mounted, single shaft arrangement of the generator and gas and steam turbine.

BACKGROUND ART

Thermal power plants having a steam turbine are frequently equipped with a steam extraction, which provides thermal energy in order to operate another plant such as an industrial plant or a district heating system.

For example, U.S. Pat. No. 4,492,084 discloses a power plant comprising steam turbines and a steam extraction arranged in the cross-over pipe leading from the exhaust of an intermediate pressure steam turbine to the inlet of a low-pressure steam turbine. The extracted steam is used for a remote heating system having a heat exchanger and a reservoir, which provides heat during time periods of peak electric loads and reduced flow in the steam extraction. The remote heating system furthermore comprises lines to recirculate the heating medium from the reservoir to the heat exchanger for reheating.

US2008/0010968 discloses a steam power plant comprising multiple steam turbines on a single shaft and steam extractions at the exhausts of two double-flow intermediate-pressure steam turbines arranged in parallel. The steam extractions are connected with two heat exchangers arranged in series in a remote heating circuit. The arrangement allows the safe control of high flow volumes of heating steam.

In power plants as above-described the steam extractions are traditionally arranged for reasons of greater stability and safety at the bottom of the steam turbines, that is at the lower casing half-shell.

SUMMARY OF INVENTION

It is an object of the invention to provide a combined cycle power plant with steam extraction for integration with a cogeneration plant or district heating system that is improved over combined cycle power plants of this type of the prior art.

A combined cycle power plant comprises a gas turbine and steam turbines arranged on a single shaft to drive a generator. The steam turbines are driven by steam generated in a heat recovery steam generator using the thermal energy of the hot gases exhausted by the gas turbine. The several steam turbines comprise at least a high-pressure turbine, an intermediate pressure turbine, and a low-pressure turbine arranged on the single shaft. The intermediate-pressure steam turbine comprises one or more steam extractions, from which steam is led to a cogeneration plant, a district heating system or an industrial plant comprising a heat consumer.

According to the invention, the single-shaft power plant is floor-mounted and the steam extractions of the intermediate-pressure steam turbine are arranged at the top of the turbine casing or, in other words, in the upper half-shell of its casing.

Floor mounted means that base plates, on which the main turbo machinery, i.e. the gas turbine system, steam turbines system and single generator, are mounted, are arranged directly on the ground. The ground is the floor of the power plant's building or its foundations. There are no pillows, suspension or springs needed or arranged between the main turbo machinery and the ground. A base plate typically is a massive concrete block. Its ground area is dimensioned to support the corresponding turbo machinery. The heights of the base plates of one single shaft power train are dimensioned so that the sum of base plate height and height from ground fixation to axis of the corresponding turbo machinery, which is to be mounted on each base plate, is constant. As a result the axis of all turbo machinery of the power train can be aligned in one level. The one or more steam extractions are configured and arranged to extract any part of steam of the intermediate pressure turbine up to all of the steam of the turbine and lead it to one or more heat exchangers arranged to heat a heat exchange medium by means of the extracted steam. The heat extraction can be controlled by controlling the steam extraction flow. To allow a control of steam extraction flow control valves are arranged in the steam extraction pipes. To allow for the floor mounted arrangement the steam extraction pipes as well as the flow control valves are arranged higher than the rotational axis of the single shaft power train. For operation of the flow control valves a drainage system is also arranged in an elevated location above the rotational axis of the single shaft power train.

The heat exchangers are arranged in a district heating system, an industrial plant, or cogeneration plant, which are operable by thermal energy delivered by the heat exchange medium heated by the extracted steam in the heat exchangers.

In one embodiment, a bypass line is provided with a flow capacity, which is sufficient to by-pass the total steam mass flow produced by the heat recovery steam generator to the first heat exchanger and/or the second heat exchanger in case the steam turbine is not operating. This allows independent operation of the gas turbine system, this improving the operational flexibility of the plant.

In one embodiment a non-return valve is arranged in a steam extraction line in an elevated location above the rotational axis of the single shaft. The non-return valve is used to assure the save operation of the steam turbine while operating the steam turbine without steam extraction. When the steam supply of the steam exchangers is tripped, for example due to a failure of the level control of the district heater, the flow control valves will be closed. The non-return valves will also close and prevent any back flow, thereby allowing a safe operation of the steam turbine without steam extraction.

In a further embodiment to improve operational flexibility of the plant, the steam extraction can also be designed as a by-pass line around the steam turbine system. Such a steam extraction line has a flow capacity, which is sufficient to take the fuel steam mass flow in case the steam turbine tips to allow independent operation of the gas turbine system from the steam turbine. For bypass operation the steam is feed directly from the main steam line before into the heat exchangers.

In an embodiment of the invention, steam extractions are arranged in pairs at the upper half-shell of the turbine casing and at the position of a selected stage of the intermediate-pressure steam turbine. The two extractions of each extraction pair are positioned on either side of the uppermost point of the casing. Such pairs of extractions can be arranged at one or more positions or stages in the intermediate-pressure steam turbine, for example at the end stage or at an intermediate stage of the turbine. Depending on the steam volume extracted, pairs of extractions or single extractions may be more advantageous. In a further embodiment of the invention, only one extraction is arranged at a selected stage of the turbine, where that extraction is positioned at the uppermost point or near the uppermost point of the upper half-shell of the turbine casing.

In the case of a double-flow intermediate-pressure steam turbine, one or more steam extractions are arranged on both flows of the turbine, where in each flow either a single extraction or a pair of extractions are arranged in the upper half-shell of the casings.

The arrangement of a steam extraction at the upper half of the intermediate-pressure turbine facilitates a floor-mounting of the turbines, which yields particular advantages for the power plant as a whole. Compared to combined cycle power plants in a multi-shaft and table-mounted arrangement, the single-shaft and floor-mounted arrangement of the power plant according to the invention allows a particularly cost and space efficient realization. Specifically, the required height for the machine hall for the power plant can be significantly reduced.

In an embodiment of the invention, a water-cooled steam condenser is arranged in a lateral configuration relative to the low-pressure steam turbine thereby avoiding the necessity of a cavity for a vertically arranged condenser.

The combined cycle power plant according to the invention allows a power plant operation at a higher efficiency compared to power plants of this type of the prior art, both at part load as well as full load operation. Due to the single-shaft arrangement a larger and more efficient generator can be driven, whereas in contrast, a multi-shaft arrangement the gas turbine and steam turbine each drive a generator, which is smaller and of lesser efficiency. Furthermore, the single-shaft and floor-mounted arrangement allows for easier and more cost efficient maintenance.

In order to allow control of the extracted steam flow, the extraction lines at the top of the intermediate-pressure steam turbine comprise butterfly valves and/or non-return valves.

BRIEF DESCRIPTION OF THE DRAWINGS

Same numerals in different figures indicate same elements.

DETAILED DESCRIPTION

Figure 1:
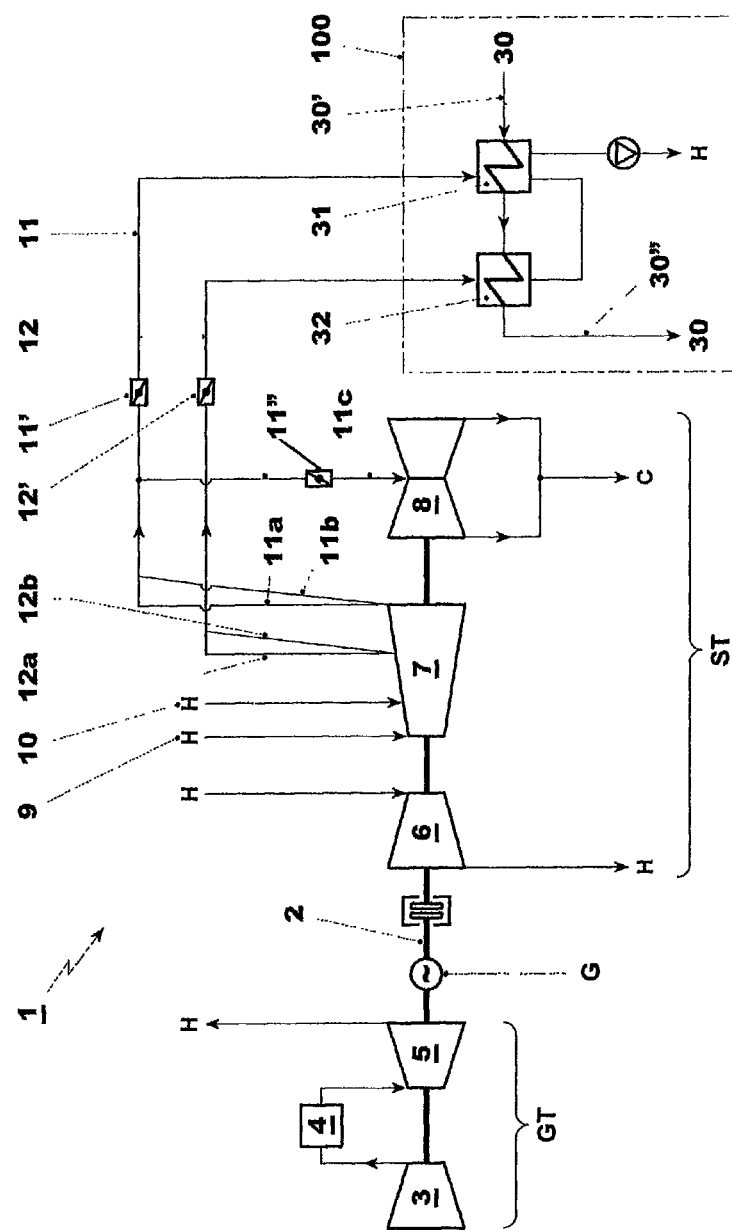
FIG. 1 shows a schematic of an exemplary embodiment of the combined cycle powerplant according to the invention.

FIG. 1 shows a combined cycle power plant 1 arranged on a single shaft 2, on which are arranged a gas turbine system GT and a steam turbine system ST driving a generator G. The power plant 1 is integrated with a cogeneration plant 100, for example an industrial plant, or district heating system 100 including a heat consumer 30. Heat is provided to the heat consumer by means of steam extractions from the steam turbine system ST and one or more heat exchangers 31 and 32.

The gas turbine system GT includes for example a compressor 3, combustion chamber 4, and expansion turbine 5, from where the exhaust gases are directed to a (not illustrated) heat recovery steam generator H. The steam turbine system ST, which is driven by steam generated in the steam generator H comprises a high-pressure steam turbine 6, an intermediate-pressure steam turbine 7, and a double-flow low-pressure steam turbine 8.

Steam expanded and exhausted by the low-pressure steam turbine is directed to a condenser C, from where the condensate and feedwater is recirculated to the steam generator H thereby completing the water-steam-cycle of the power plant.

The intermediate-pressure steam turbine 7 is driven by steam reheated in the steam generator H and directed to the turbine by means of line 9, optionally also by line 10.

Pairs of steam extractions are arranged at the intermediate-pressure steam turbine 7, for example steam extractions 12a and 12b arranged at an intermediate stage of that steam turbine 7, and steam extractions 11a and 11b arranged at the last stage of the intermediate-pressure turbine 7. A heating medium of the cogeneration plant 100 is directed from a heat consumer 30 via line 30' to be reheated in first and second heat exchangers 31 and 32 respectively, which are arranged in series. The steam is then directed via line 30" to the heat consumer 30. The extracted steam from extractions 11a, b at the last stage of turbine 7 are led to the first heat exchanger 31, where the steam from extractions 12a and b at the intermediate stage of turbine 7 is led to the second heat exchanger 32.

The steam flow through extraction lines 11a and b is controlled in each line by a butterfly valve 11', where the pressure of the steam flow is controlled in accordance with the operational specifications of the heat exchanger 31, for example steam pressures of about 1 bar. A butterfly valve 11" is arranged in a line 11c branching off of the extraction line 11a,b to the inlet to the low-pressure steam turbine 8, where this valve 11" can increase the steam pressures up to 2 bar.

Similarly, the steam flow through the extraction line 12a, b is controlled by means of a butterfly valve 12' in accordance with the specifications of heat exchanger 32.

The valves 11', 11", 12' are operated to control the steam flow to the heat exchangers 31 and 32 and the low-pressure steam turbine depending on the needs of thermal energy in the cogeneration plant 100 and the load of the power plant. In case of a full steam extraction, the low-pressure turbine is operated with a minimum steam flow sufficient to enable cooling of the turbine only.

The valves allow control of the degree of extraction ranging from zero percent extraction and full operation of the low-pressure steam turbine up to an operation of the power plant with full steam extraction from the intermediate-pressure steam turbine to operate the cogeneration plant. In such case, the low-pressure turbine is operated only in a cooling minimum load.

Figure 2:
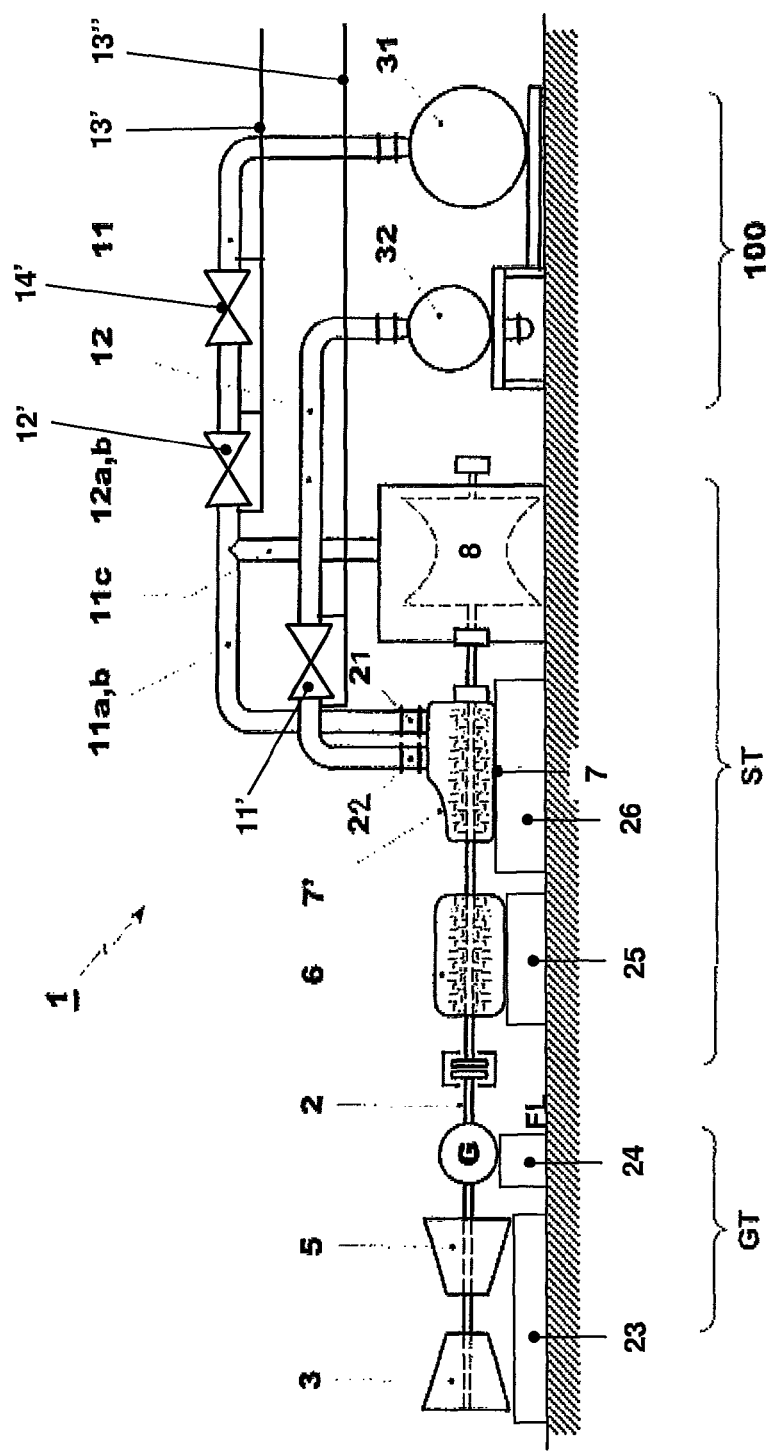
FIG. 2 shows a side view of a combined cycle power plant according to the invention and in particular the arrangement of the steam extractions at the intermediate-pressure steam turbine.

The power plant 1 according to the invention, as shown in FIG. 2, includes the gas turbine system GT and steam turbine ST arranged on a single shaft 2, on which the single generator G is rotated. All elements of the plant are mounted on floor level FL. Each of the main turbo machinery equipment is mounted on the floor FL or a base plate, which is arranged directly on the ground. In the example shown, the gas turbine system GT is mounted on a base plate 23, the generator G is mounted on a base plate 24, the high pressure steam turbine 6 is mounted on a base plate 25, and the intermediate-pressure steam turbine 7 is mounted on a base plate 26. The low-pressure steam turbine 8 is directly mounted on the floor FL of the combined cycle power plant 1, which in this case is a sufficiently strong foundation. Typically also the low-pressure steam turbine 8 is mounted on a base plate. Further, this lay out allows the arrangement of the condenser C of the low-pressure steam turbine 8 on same level as the low-pressure steam turbine 8 on the ground of the combined cycle power plant 1. Thus an underground arrangement can be avoided, which leads to significant cost savings. The arrangement of the steam extraction line at the intermediate-pressure steam turbine 7 are shown in greater detail, in particular their arrangement at the upper half-shell 7' of the steam turbine 7, which facilitates the floor-Mounting of the power plant. A first adapter 21 is arranged at the last stage of the turbine 7 and at the upper half-shell 7' of the turbine casing, where the adapter accommodates a pair of two steam outlets through the casing, or extractions as they were indicated by 11a and 11b in FIG. 1. The two steam outlets are arranged on either side of the uppermost point of the casing 7'. A single steam pipe 11 leads away from the adapter 21 and to the first heat exchanger 31. At the level of the low-pressure steam turbine 8, a line 11c leads away from line 11 and to the inlet of the low-pressure turbine 8. (The steam turbine control valves are not shown in this figure). Downstream of the lead to the low-pressure steam turbine 8 a flow control valve 12' is arranged in the steam extraction pipe 11, which allows a control of the steam extraction to the first heat exchanger 31. Like the steam extraction pipe 11 itself the flow control valve 12' is arranged above the shaft 2. For safe transient operation a non-return valve 14' is also arranged in the steam extraction pipe 11.

In the exemplary embodiment shown in FIG. 2, a second adapter 22 is arranged at an intermediate stage of the turbine 7, which contains a second pair of extractions as indicated by 12a and 12b in FIG. 1, a pair of steam outlets through the turbine casing. The steam outlets are again arranged to either side of the uppermost point of the upper half-shell 7' of the turbine casing. A single steam pipe leads away from the adapter 22 accommodating a steam volume exhausted by the turbine 7 at an intermediate stage and leading it to the second heat exchanger 32. A flow control valve 11' is arranged in the steam extraction pipe 12, which allows a control of the steam extraction to the heat exchanger 32. Like the steam extraction pipe 12 itself the flow control valve 12' is arranged above the shaft 2.

Further, steam extraction drain systems 13', 13" are arranged at the flow control valves 11', 12' and non-return valve 14'. Preferably the drain systems 13', 13" are also arranged above the shaft 2.

The exemplary embodiment shows two pairs of steam extractions at different stages of the intermediate-pressure steam turbine. An embodiment with only one pair of extractions is also possible, depending on the needs of the cogeneration plant. In a variant of the invention, the steam extraction can be realized by means of only extraction line, instead of a pair of extractions, at least for the extraction at an intermediate stage of the turbine, where steam flow volume may be accommodated by a single piping.

Figure 3:
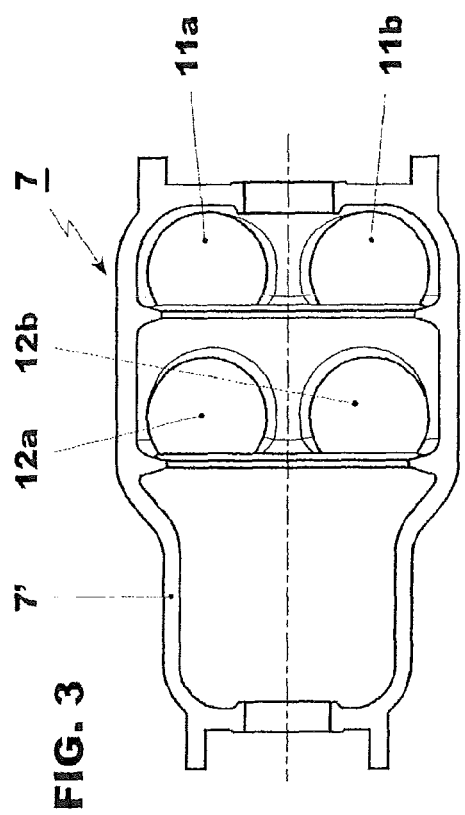
FIG. 3 shows in a top view a horizontal section of the steam extractions in the top half-shell of the intermediate-pressure steam turbine casing.

FIG. 3 illustrates an embodiment of the steam outlets in the intermediate-pressure steam turbine 7 casing for steam extraction. The example shows the arrangement of the pair of extraction outlets 11a and *b* at the final stage of the turbine and of a second pair of extraction outlets 12a and *b* at an intermediate turbine stage.

They are both arranged symmetrically in relation of the uppermost point of the casing half-shell.

Figure 4:
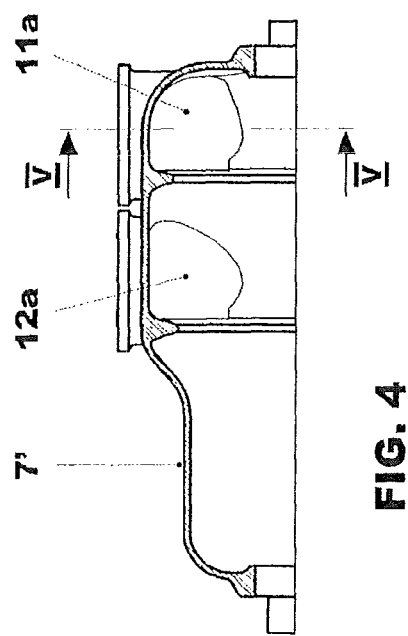
FIG. 4 shows a meridional section of the intermediate-pressure steam turbine of FIG. 3.

FIG. 4 shows the extraction 12a at the intermediate stage and the extraction 11a at the final stage of the turbine 7, each arranged near the uppermost position of the casing.

Figure 5:
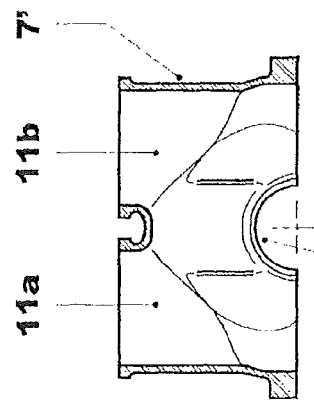
FIG. 5 shows an axial section of the intermediate-pressure steam turbine according to V-V in FIG. 4.

Similarly, FIG. 5 shows an example of the pair of extractions 11a and 11b in symmetric arrangement at the final stage of the turbine.

The invention claimed is:

1. A combined cycle power plant comprising:
   a gas turbine system and a steam turbine system arranged on a single shaft and a single generator, where the steam turbine system comprises at least a high-pressure turbine, an intermediate-pressure turbine, and a low-pressure turbine, where the power plant is integrated with a cogeneration plant, district heating system, or industrial plant comprising a heat consumer by means of a plurality of steam extraction lines leading from the intermediate-pressure steam turbine to at least one heat exchanger coupled to the cogeneration plant, district heating system, or industrial plant,
   the power plant being arranged with base plates, which are directly arranged on the ground of the combined cycle power plant, and onto which the gas turbine system, the steam turbine system and the single generator are directly mounted, and in that the intermediate-pressure steam turbine including one or more steam extractions, which are arranged at an upper half shell of a casing of the intermediate-pressure steam turbine,
   the steam extraction lines being coupled to the steam extractions, with flow control valves arranged in the steam extraction lines to allow a control of a steam extraction flow from the intermediate-pressure steam turbine,
   wherein the steam extraction lines, as well as the flow control valves are arranged higher than the rotational axis of the single shaft to allow for the mounting of the turbo machinery on the base plates;
   the steam extractions further comprising at least two pairs of steam extractions, a first pair being arranged through the casing at a final stage of the intermediate-pressure steam turbine including one each of the first pair of steam extractions being disposed on either side of an axis of the single shaft, and a second pair being arranged through the casing at an intermediate stage of the intermediate-pressure steam turbine including one each of the second pair of steam extractions being disposed on either side of the axis of the single shaft.

2. The combined cycle power plant according to claim 1 wherein
   the one or more steam extractions at the intermediate-pressure steam turbine are configured and arranged to extract any part of steam flow of the intermediate-pressure turbine up to all of the steam flow of the intermediate-pressure turbine and the steam extraction lines lead to one or more heat exchangers arranged to heat a heat exchange medium of the cogeneration plant, district heating system, or industrial plant by means of the extracted steam.

3. The combined cycle power plant according to claim 2 wherein
the steam extractions at the intermediate-pressure steam turbine are arranged in pairs at the upper half-shell of the turbine casing at a given stage of the intermediate-pressure steam turbine and where the two individual extractions of a pair of extractions are positioned to either side of the uppermost point of the casing of the intermediate-pressure steam turbine.

4. The combined cycle power plant according to claim 2 further comprising
one steam extraction arranged at a given stage of the intermediate-pressure steam turbine, where that extraction is positioned at the uppermost point or near the uppermost point of the upper half-shell of the turbine casing.

5. The combined cycle power plant according to claim 2 wherein
the intermediate-pressure steam turbine is a double-flow steam turbine and one or more steam extractions are arranged on both flows of the turbine, where in each flow either a single steam extraction or a pair of steam extractions are arranged in the upper half-shell of the casings.

6. The combined cycle power plant according to claim 1, further comprising a water-cooled steam condenser arranged in a lateral configuration relative to the low-pressure steam turbine.

7. The combined cycle power plant according to claim 1, further comprising a water-cooled steam condenser arranged on the same level above on the ground as the low-pressure steam turbine.

8. The combined cycle power plant according to claim 1 wherein the extraction lines from the intermediate-pressure steam turbine comprise butterfly valves and/or non-return valves.

9. The combined cycle power plant according to claim 1 wherein the gas turbine system and the steam turbine system drive a single generator.

10. The combined cycle power plant according to claim 1, further comprising a non-return valve arranged in a steam extraction line at an elevated location above the rotational axis of the single shaft.

11. The combined cycle power plant according to claim 1, further comprising a drainage system for the flow control valve and/or the non-return valve arranged at an elevated location above the rotational axis of the single shaft.

12. The combined cycle power plant according to claim 1, further comprising a by-pass line provided to by-pass the total steam mass flow produced by the heat recovery steam generator to the first heat exchanger and/or second heat exchanger in case the steam turbine is not operating, allowing independent operation of the gas turbine system.

13. The combined cycle power plant according to claim 1, further comprising wherein the at least one heat exchanger is mounted to the ground of the combined cycle power plant and/or a base plate arranged thereon.

\* \* \* \* \*